United States Patent [19]
Lundman

[11] Patent Number: 5,353,842
[45] Date of Patent: Oct. 11, 1994

[54] INFLATABLE PLUG FOR USE IN PLUGGING A LARGE DIAMETER PIPE

[76] Inventor: Philip L. Lundman, 3631 Fredonia-Kohler Dr., Fredonia, Wis. 53021

[21] Appl. No.: 103,820

[22] Filed: Aug. 9, 1993

Related U.S. Application Data

[63] Continuation of Ser. No. 839,327, Feb. 20, 1992, abandoned.

[51] Int. Cl.⁵ ............................................. F16L 55/12
[52] U.S. Cl. ......................................... 138/93; 138/89
[58] Field of Search .................................. 99/93, 91, 89

[56] References Cited

U.S. PATENT DOCUMENTS

| | | | |
|---|---|---|---|
| 2,678,666 | 5/1954 | Theis et al. | 138/93 |
| 3,431,946 | 3/1969 | Sawyer | 138/93 |
| 4,079,755 | 3/1978 | Van der Lans | 138/93 |
| 4,203,476 | 5/1980 | Vitellaro | 138/129 |
| 4,291,727 | 9/1981 | Yie et al. | 138/93 |
| 4,354,515 | 10/1982 | Sutherland | 138/90 |
| 4,467,836 | 8/1984 | Ragout | 138/93 |
| 4,614,206 | 9/1986 | Mathison et al. | 138/90 |
| 4,895,185 | 1/1990 | Champleboux et al. | 138/93 |

FOREIGN PATENT DOCUMENTS 0015413  12/1905  Norway ............... 138/91

*Primary Examiner*—David A. Scherbel
*Assistant Examiner*—James F. Hook
*Attorney, Agent, or Firm*—Michael, Best & Friedrich

[57] ABSTRACT

An inflatable plug adapted to be inserted into a pipe and inflated to plug the pipe and create therein a watertight seal. The inflatable plug includes a cylinder surrounded by a sleeve formed by layers of elastomeric material wrapped around the cylinder. The opposite ends of the sleeve are clamped to the cylinder ends. The inflatable plug also includes a fluid passage for supplying pressurized fluid between the cylinder and the elastomeric sleeve for inflating the elastomeric sleeve.

16 Claims, 1 Drawing Sheet

INFLATABLE PLUG FOR USE IN PLUGGING A LARGE DIAMETER PIPE

This application is a continuation of Ser. No. 07/839,327, filed Feb. 20, 1992, now abandoned.

FIELD OF INVENTION

The invention relates to a method and apparatus for sealing a pipe to preclude fluid flow through the pipe and alternatively to remove obstructions from a pipe. More particularly, the invention relates to inflatable plugs adapted to be inserted into pipelines or sewer lines to plug the pipe and thereby permitting pipe maintenance, facilitate toxic waste containment or permit blockage removal through delivery of pressurized fluid through the plug.

BACKGROUND PRIOR ART

Inflatable plugs are used for plugging pipelines such as sewer lines to permit pipe maintenance, facilitate toxic waste containment, or remove blockages. Such inflatable plugs include inflatable rubber pillows or cylinders which are inserted into the pipeline and inflated with air so that they will fill the pipeline and function as a plug.

One prior art inflatable plug includes an inflatable heavy cylindrical rubber plug having a size only slightly less than the internal diameter of the pipe to be plugged. An example of such a plug is manufactured by Vetter, Zuelpich, West Germany. Such inflatable rubber plugs are inserted into a pipeline or sewer line and then connected to a source of air pressure so that they inflate slightly to fill the pipe. One of the uses of inflatable plugs is in the handling of liquid waste accidents. In the event of a liquid waste spill, an inflatable plug can be inserted into a sewer line to prevent the liquid waste from entering the sewer system. The liquid waste can then be pumped into a proper holding vessel and disposed of.

Another use of inflatable plugs is in repair of broken sewer lines, water lines, or other pipes. The plugs can be inserted into the sewer lines or water lines upstream of the break to thereby block that pipe and permit repair of the break.

Still another use of inflatable plugs is in clearing a blockage in a pipe. An example of such a plug is shown in applicant's U.S. Pat. No. 3,714,951, showing an inflatable drain cleaner which uses water pressure to remove an obstruction from a clogged drain. This type of plug includes a conduit passing through the plug and allowing fluid to pass therethrough. When the plug is inflated by fluid pressure and lodged in place, pressurized fluid is also discharged from the end of the plug thereby clearing the blockage from the pipe.

Because of the wide variety of sizes of sewer pipes or water pipes, if prior art inflatable plugs are to be used, it is necessary to have on hand a number of plugs of varying sizes.

Another drawback of prior art inflatable plugs is that they are relatively large when compared to the size of the pipes being plugged, and they are also comprised of relatively inflexible material such that they may be difficult to insert into the pipe. For example, in the case of a horizontal pipe, it may be necessary to insert the plug vertically downwardly through a manhole and then turn the plug 90° such that it can be inserted horizontally into a pipe. Due to the large size and relative inflexibility of the prior art inflatable plugs, such manipulation of the plugs may be difficult, particularly in the case of a liquid waste spill where time is essential.

Another drawback of prior art inflatable bags is that they are typically comprised of one or more pieces of elastic material joined at a seam to form an enclosure. This seam can provide a weak point which may fail under pressure, causing a failure of the plug.

Attention is also directed to the pillow-shaped inflatable pipeline plugs manufactured by Circle Gas & Manufacturing Co., Scranton, Pa. and to applicant's U.S. Pat. No. 4,565,222, showing an inflatable apparatus for use in plugging a large diameter pipe. Other related devices are shown in the Anderson U.S. Pat. No. 3,086,540; the Lasting U.S. Pat. No. 3,075,535; and the Amet U.S. Pat. No. 1,308,469.

SUMMARY OF THE INVENTION

The present invention provides an inflatable plug for use in sealing pipes. The inflatable plug may be made specifically for use with a single size of pipe or may be made to plug various sizes of pipe. The inflatable plug embodying the invention is economically manufactured using various suitable materials and the elastomeric material used as the inflatable component provides a seamless and, therefore, stronger plug than prior art plugs.

More particularly, in one embodiment of the invention the inflatable plug includes a relatively rigid cylinder which has a central longitudinally extending bore. The cylinder is covered by a sheet of elastomeric material spirally wound around the cylinder. Means are included to clamp the ends of the elastomeric material to the cylinder ends, thereby forming fluid tight seals. In a preferred form of the invention, the clamping means include band clamps extending around each end of the cylinder and sealing the elastomeric sheet and the cylinder.

In one embodiment of the invention a fluid passage is provided for supplying pressurized fluid between the cylinder surface and the elastomeric material and for inflating the elastomeric material.

In a preferred form of the invention, a plurality of layers of elastomeric material are wound around the cylinder, and adhesive is applied between the layers to bond the layers of material to one another.

One of the principal advantages of the present invention is that it may be used alternatively as a plug for sealing pipes to thereby facilitate repairs or preventing flowage of hazardous materials in the pipe or it may be used for clearing a blockage from a pipe.

Another advantage of the inflatable plug embodying the invention is that separate fluid pressure sources can be used for inflation of the elastomeric and removal of blockages from a pipe. This feature reduces the risk of catastrophic failure of the plug. For example, a first controlled pressure source may be used to secure the plug in the pipe while a second pressure source may be used to clear the blockage. The feature allowing the use of a controlled pressure source to inflate the plug reduces the risk that the inflatable plug will burst.

Another advantage of the inflatable plug embodying the invention is that it is easily and efficiently manufactured. Unlike the prior art constructions, the method of wrapping elastomeric material around a cylinder is quicker and more efficient because there are no seams to sew or attach together.

Another advantage of the invention is that the lack of seams in the inflatable plug provides a strong plug less prone to failure than prior art arrangements.

Another advantage of the present invention is that different types of elastomeric material may be used depending on the particular application. For example, where more plug holding strength is required, a stronger elastomeric material possessing limited expansion characteristics may be used. For this application, the required plug, when deflated, would substantially approximate the size of the pipe to be plugged. In another application, where less plug holding strength is required and more expansion is desired, an elastomeric material having high expansion characteristics may be used.

Various other features and advantages of the invention will be apparent by reference to the following description of the preferred embodiment, by reference to the drawings, and by reference to the claims.

DESCRIPTION OF PREFERRED EMBODIMENT

Figure 1:
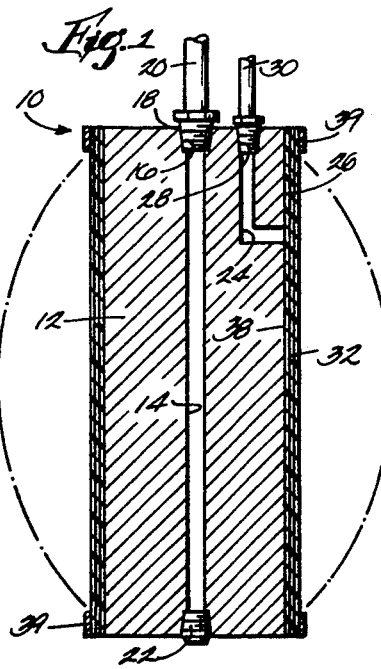
FIG. 1 is a cross section elevation view of an inflatable plug embodying the invention.

Illustrated in FIG. 1 is an inflatable plug 10 embodying the invention. The inflatable plug 10 includes a central cylinder 12 having opposite ends, the cylinder having a central longitudinal bore 14 extending the length of the cylinder along a central longitudinal axis. The opposite ends of the central longitudinal bore 14 are threaded, one end 16 being adapted to facilitate attachment of a threaded nozzle 18 of a hose 20 and the opposite end adapted to receive a removable threaded bore end cap 22. A second conduit 24 communicates between the end of the cylinder attached to the hose and the outer surface 26 of the cylinder. The second conduit 24 also includes a threaded end 28 adapted to facilitate connection of a source of fluid pressure, such as hose 30, to the second conduit 24.

Figure 2:
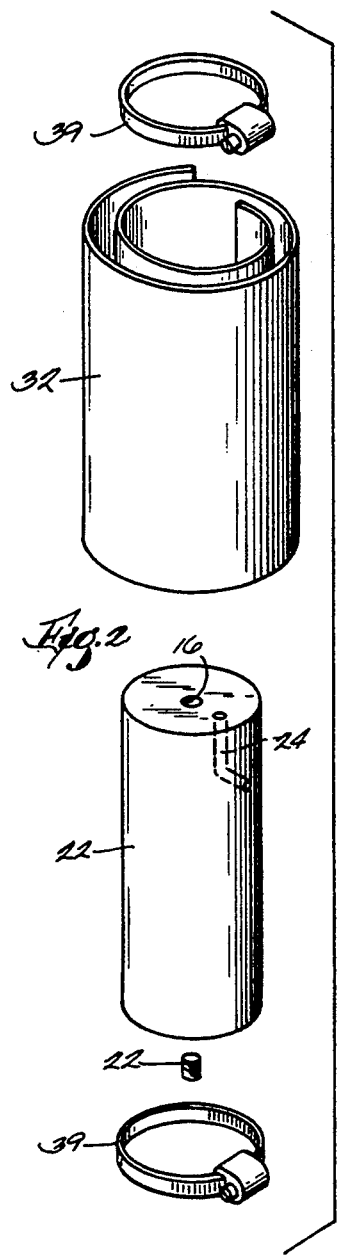
FIG. 2 is an exploded perspective view of the inflatable plug illustrated in FIG. 1.

The inflatable plug 10 further includes a covering or sleeve of elastomeric material 32 surrounding the cylinder 12. While other durable elastomeric sheet materials can be used, in one form of the invention the sleeve 32 is formed from a sheet of EPDM or nitrile. As best shown in FIG. 2, the elastomeric sleeve 32 is formed from a single sheet of elastomeric material and then wrapped around the cylinder so that a plurality of layers 34 of material form the inflatable sleeve of the plug.

Figure 3:
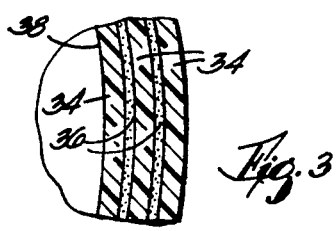
FIG. 3 is an enlarged cross section view of a portion of the inflatable plug shown in FIG. 1.

As shown in FIG. 3, in a preferred form of the invention an elastic adhesive 36 is applied between each layer 34 of elastomeric material to bind the multiple layers 34 together. In this fashion, a uniform, durable, and expandable sleeve 34 or covering is formed.

Means are also provided for clamping the opposite ends of the sleeve 32 to the opposite ends of the cylinder 12. While other means for clamping could be employed in the illustrated arrangement, band clamps 39 surround the opposite ends of the sleeve 32 and are tightened to force the ends of the sleeves into clamped engagement with the ends of the cylinder 12.

Figure 5:
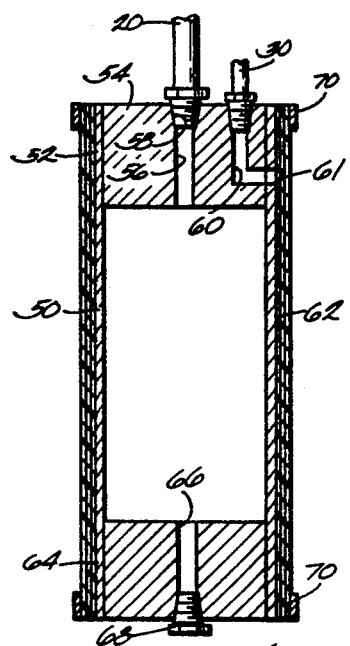
FIG. 5 is a view similar to FIG. 1 but showing an alternative embodiment of the invention.

The elastomeric sleeve or covering also includes an inner surface 38. As shown in FIGS. 1 and 5, this inner surface is in contact with the outer cylinder surface 26 and in fluid communication with the conduit 24 provided to supply pressurized fluid to the area between the sleeve 32 and cylinder 12.

Figure 4:
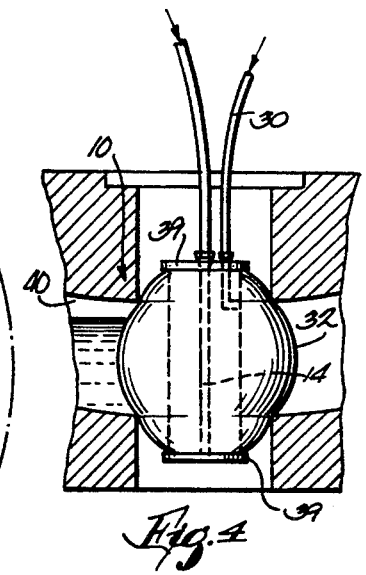
FIG. 4 is a perspective view of the inflatable plug shown in FIG. 1 used to block fluid flow in a pipe.

FIG. 4 shows the use of the inflatable plug embodying the invention in an application where it is desired to block the flow of fluid through a pipe. The inflatable plug 10 is inserted in deflated form into the pipe system 40 to the desired position. Fluid pressure is applied to the second conduit 24 through the hose 30 to inflate the plug. The pressurized fluid flows through the conduit 24 to the area between inner surface 38 of the elastomeric sleeve and the cylinder 12. Fluid pressure causes the elastomeric sleeve to separate from the cylinder and inflate. This inflation increases the plug's size in balloon-like fashion until the plug becomes a complete blockage in the pipe.

The inflatable plug illustrated in FIG. 1 may also be used to clear a blockage from a pipe. In this application, a hose 20 is connected to the threaded end 16 of the conduit 14 and the threaded plug 22 is removed from the opposite end of the plug. The inflatable plug is inserted into a blocked pipe and inflated in the same manner as shown in FIG. 4. Fluid pressure is then forced through the conduit 14 by a hose 20 to generate fluid pressure between the blockage and the inflatable plug. This fluid pressure will discharge the blockage from the pipe.

Another embodiment of the invention is illustrated in FIG. 5. In this embodiment, the cylinder 50 is comprised of a section of pipe, such as PVC pipe, the cylinder 50 having a first end portion 52 housing a first end plug 54 in sealed relation. The first end plug 54 includes a central axially extending bore 56. The bore 56 includes a threaded end 58 adapted to accommodate the threaded end of a hose 20 or a threaded cap (not shown). The end plug 54 also includes a second fluid passage 60 having a threaded end adapted to be connected by a hose 30 to a source of fluid pressure. The passage 60 extends to the inner surface of the cylinder sidewall. A hole or passage 61 is provided in the cylinder sidewall to define a passage from the inner cylinder surface to the outer cylinder surface to facilitate inflation of an elastomeric sleeve 62. The sleeve 62 has the same construction as the sleeve 32 illustrated in FIG. 1. The cylinder 50 also includes a second end portion 64. A second end plug 66 is housed in the second end portion 64 of the cylinder 50 and, like the first end plug 54, includes an axially extending bore 66, the bore 66 having a threaded end adapted to house a threaded plug 68. Like the embodiment shown in FIG. 1 and described above, in the embodiment of FIG. 5 the opposite ends of the elastomeric sleeve 62 are clamped to the opposite ends of the cylinder 50 by band clamps 70.

As with the embodiment shown in FIGS. 1-3, the elastomeric sleeve shown in FIG. 5 is comprised of a single sheet of elastomeric material preferably EPDM or nitrile. Furthermore the sleeve includes an elastic adhesive applied between each layer of material to bind the multiple layers together. In this fashion, a uniform, durable, and expandable sleeve is created.

While in one form of the invention the elastomeric material forming the sleeve comprises EPDM or nitrile, the elastomeric material can be selected depending on the amount of inflation of the plug desired and the strength required of the plug. Elastomeric materials having high strength and the ability to withstand high pressures also tend to be relatively inelastic. On the other hand, elastic materials which will inflate substantially have a lower ultimate strength.

In some applications of the invention the inflated plug may be subjected to high fluid pressures in a pipe and it is important that the inflatable plug be inflated under high pressure in order to maintain the plug in place in such applications. In other applications it may be desired that the inflatable plug be useful in pipes of various sizes. One of the advantages of the invention is that the elastomeric material sleeve can be made of various elastomeric sheet materials depending on the intended use of the inflatable plug. In those cases where the inflatable plug will be subjected to high fluid pressures, a high strength elastic sheet material can be used. In those cases where high strength is not required but where more flexibility of application is desired, a more elastic or flexible sheet material can be used in forming the elastomeric sleeve.

The operation of the embodiment illustrated in FIG. 5 is essentially the same as that of the embodiment illustrated in FIG. 4 and described above. Fluid pressure applied to the second conduit 60 in the end plug 54 must additionally pass through the hole 61 to the inner surface of the elastomeric sleeve 62 to inflate the sleeve 62.

Figure 6:
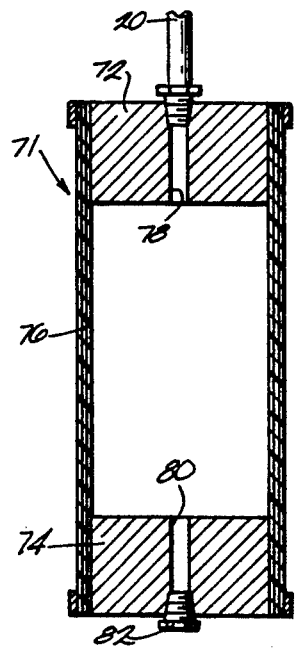
FIG. 6 is a view similar to FIGS. 1 and 5 and showing another alternative embodiment of the invention.

Another alternative embodiment of the invention is illustrated in FIG. 6. The inflatable plug 71 shown there includes a pair of end plugs 72 and 74 and the opposite ends of an elastomeric sleeve 76 are clamped directly to the end plugs 72 and 74.

The end plugs 72 and 74 include axially extending bores 78 and 80, respectively. The ends of the axially extending bores 78 and 80 are threaded to receive the threaded end of a hose 20 and a threaded plug 82, respectively.

The embodiment of FIG. 6 is similar in operation to the embodiment of FIG. 5. However the inflatable plug 71 is inflated by application of fluid pressure through the bore 78. The increase in fluid pressure in the sleeve 78 between the end plugs 72 and 74 causes the sleeve 76 to inflate. The sleeve can become lodged in block a pipe. This embodiment may be used as a plug wherein a threaded plug 82 is housed in the end of the bore 80 or alternatively, the bore 82 may be left open to allow the plug to be used to clear a blockage in a pipe in the manner described above.

Various features of the invention are set forth in the following claims.

I claim:
1. An inflatable plug comprising:
a cylinder having first and second ends, a central longitudinal axis, and an outer surface;
an inflatable sleeve of elastomeric material surrounding said outer surface of said cylinder, said sleeve having opposite ends and being formed by winding a sheet of cured elastomer material circumferentially around said cylinder to form plural layers;
means for clamping one end of said sleeve to said first cylinder end;
means for clamping the opposite end of said sleeve to said second cylinder end;
and means for supplying pressurized fluid between said cylinder outer surface and said sleeve for inflating said sleeve with respect to said cylinder.

2. The inflatable plug as set forth in claim 1 wherein said plurality of layers of elastomeric material are bonded together by adhesive.

3. The inflatable plug as set forth in claim 1 wherein the cylinder includes a central longitudinally extending bore having opposite ends, one of the opposite ends being threaded to accommodate therein the threaded end of a hose.

4. The inflatable plug set forth in claim 1 wherein said means for clamping one end of said sleeve includes a band clamp.

5. The inflatable plug as set forth in claim 1 wherein said elastomeric material comprises EPDM or nitrile.

6. The inflatable plug as set forth in claim 1 wherein said sheet has opposite edges which when wound circumferentially around said cylinder form said opposite ends of said elastomeric sleeve.

7. An inflatable plug comprising
a cylinder having opposite ends and a central longitudinal axis, the cylinder having an outer generally cylindrical surface, having opposite ends and a central longitudinal extending bore;
an elastomeric sleeve surrounding said outer generally cylindrical surface, said elastomeric sleeve having a first and a second end, said elastomeric sleeve being formed by winding a sheet of cured elastomeric material spirally around said cylinder to form plural layers;
means for clamping the first end of the sleeve to one of the opposite ends of the outer generally cylindrical surface;
means for clamping the second end of the sleeve to the opposite end of the outer generally cylindrical surface;
the cylinder including a passage extending from one of the opposite ends of the cylinder to the outer generally cylindrical surface.

8. The inflatable plug as set forth in claim 7 wherein said means for clamping the first and second sleeve ends end includes band clamps surrounding each of said opposite cylinder ends.

9. The inflatable plug as set forth in claim 7 wherein said passage includes a portion intersecting the end of the cylinder, said portion of the passage including means for attachment of the passage to a source of fluid pressure.

10. The inflatable plug as set forth in claim 7 wherein said longitudinally extending central bore includes opposite ends, one end being adapted to be connected to a second source of fluid pressure and an opposite end opening at said opposite end of the cylinder.

11. The inflatable plug as set forth in claim 7 and further including adhesive joining said plural layers of said elastomeric sheet together.

12. The inflatable plug as set forth in claim 7 wherein said elastomeric sheet material comprises EPDM or Nitrile.

13. The inflatable plug set forth in claim 7 wherein said sheet has a first edge and a second edge which when spirally wound around said cylinder form said first and second end respectively of said elastomeric sleeve.

14. An inflatable plug for use in a conduit, the inflatable plug comprising:
an inflatable sleeve of elastomeric material having opposite ends, a central longitudinal axis, and inner and outer surfaces, said inner surface defining a central longitudinally extending bore, said inflatable sleeve comprised of a sheet of elastomeric material wound circumferentially about said longitudinal axis to form a plurality of layers and an elastic adhesive between said layers, thereby sealingly connecting said layers together, a first end plug housed in said bore in one of said opposite inflatable sleeve ends, said first end plug having therein conduit means for supplying fluid pressure to said inflatable sleeve bore, a second end plug housed in said bore in the other end of said inflatable sleeve, and clamping means for clamping said ends of said inflatable sleeve to said end plugs thereby sealing the interface between said ends of said inflatable sleeve and said end plugs.

15. The inflatable plug as set forth in claim 14 wherein said means for clamping the opposite ends of said inflatable sleeve to the first and second end plugs includes first and second band clamps.

16. The inflatable plug set forth in claim 14 wherein said conduit means comprises an end plug bore having a smaller diameter than said inflatable sleeve bore, said end plug bore being threaded to accommodate therein the threaded end of a hose.

* * * * *